L. Wight,
Grain Drill.
No. 112,663. Patented Mar. 14, 1871.
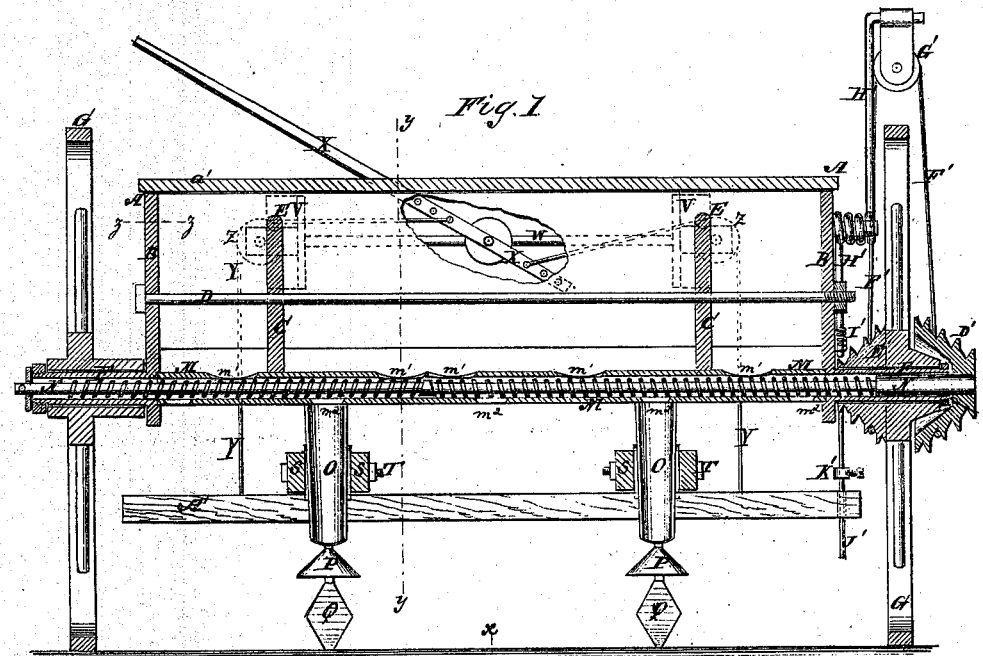
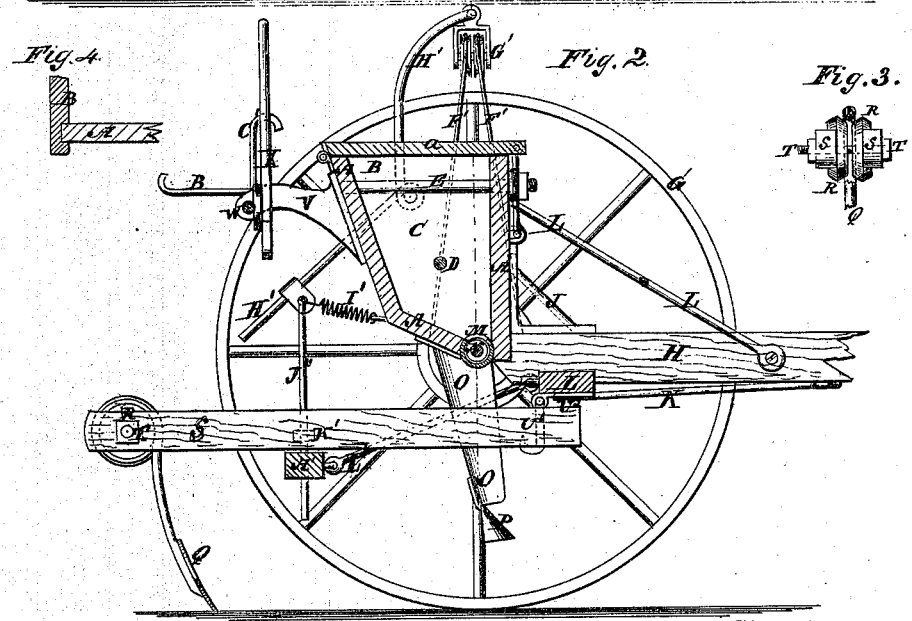
Witnesses:
E. Hoff
L. S. Mabee
Inventor:
Lyman Wight
per Munn & Co.
Attorneys.

United States Patent Office.

LYMAN WIGHT, OF WHITEWATER, ASSIGNOR TO HIMSELF AND ORISON G. EWING, OF LA GRANGE, WISCONSIN.

Letters Patent No. 112,663, dated March 14, 1871.

---

IMPROVEMENT IN BROADCAST SEEDERS AND CULTIVATORS COMBINED.

---

The Schedule referred to in these Letters Patent and making part of the same.

---

*To all whom it may concern:*

Be it known that I, LYMAN WIGHT, of Whitewater, in the county of Walworth and State of Wisconsin, have invented a new and useful Improvement in Broadcast Seeder and Cultivator; and I do hereby declare that the following is a full, clear, and exact description thereof, which will enable others skilled in the art to make and use the same, reference being had to the accompanying drawing forming part of this specification, in which—

Figure 1 is a detail vertical section of my improved machine taken through the line $x\ x$, fig. 2.

Figure 2 is a detail vertical section of the same taken through the line $y\ y$, fig. 1.

Figure 3 is a detail view of the device for holding the cultivator-teeth.

Figure 4 is a detail section taken through the line $z\ z$, fig. 1.

Similar letters of reference indicate corresponding parts.

My invention has for its object to furnish an improved machine, simple in construction, effective in operation, and easily operated, and which shall be so constructed as to adapt it for use as a broadcast seeder or cultivator, as may be desired; and It consists in the construction and combination of various parts of the machine, as hereinafter more fully described.

A is the seed-box, the front board of which is made vertical, and the bottom and rear side are made inclined, as shown in fig. 2, so as to cause the seed to pass down freely into the angle between the front side and bottom of the said seed-box and prevent the seed from bridging or clogging.

The ends B of the box A are cast, and have grooves or flanges formed in them to receive the ends of the front, bottom, and rear boards of the seed-box A.

The seed-box A is strengthened by one, two, or more cross-partitions, C, by a long bolt, D, passing through the ends B of said box A, and by the cross-bolts E passing through the front and rear sides of said box. By this construction the seed-box is made so strong that no frame is required to support it.

Upon the end pieces B are cast the hollow axles F, upon which the hubs of the wheels G work, as shown in fig. 1.

H is the tongue, the rear end of which is securely attached to the middle part of the seed-box A, and to the rear part of which is attached a cross-bar, I, with which the end parts of the box A are connected by the rods J.

The end parts of the cross-bar I are connected with the tongue H by the brace-bars K.

L are brace-rods, the lower ends of which are secured to the tongue H, and the upper ends of which are secured to the ends of the cross-bolts E.

In the angle between the front and bottom boards of the box A is secured a pipe, M, which serves as a continuation of the hollow axles F, as shown in fig. 1.

In the upper side of the pipe M are formed several holes $m^1$, for the seed to enter the pipe M, and in the lower side of the said pipe, at suitable distances apart, and in positions not directly beneath the ingress openings, are formed egress openings $m^2$, through which the seed escapes from said pipe to the ground.

N is a rod, extending through the pipe M and hollow hubs F from side to side of the machine, upon which are formed screw-threads by winding a wire of suitable form and size spirally around the said rod, or by cutting the said thread upon the rod, or in any other convenient manner.

To the bottom of the seed-box A, around the discharge-openings $m^2$ of the pipe M, are secured the upper ends of the conductor-spouts O which receive the seed from said discharge-openings and conduct it to the ground.

To the lower ends of the spouts O are attached the apexes of the cones or semi-cones P, upon which the seeds from the spouts O fall, and by which they are scattered.

Q are the cultivator-teeth, the upper ends of the shanks of which are bent over to form an eye.

R are two washers, the inner edges of which are beveled off, as shown in fig. 4, and upon the outer sides of which are formed shoulders to receive the rear ends of the two beams S.

The washers R are placed one upon each side of the eye of the shank of the plow Q, and the washers and eye are placed between the rear ends of a pair of beams, S.

A bolt, T, is then passed through the eye, washers, and beams, securely clamping the said five parts to each other. By this construction the plows may be secured to the beams with any desired strength, and, at the same time, in such a way that, should the plow strike an obstruction, it will be turned back instead of being broken.

The forward ends of each pair of beams S are hinged to the cross-bar I by means of a long staple, $U^1$, and a strap or clasp, $U^2$.

To the rear ends of the cross-bolts E are attached the brackets V, to which are pivoted the ends of a roller, W, to the center of which is pivoted a lever, X.

To the lever X, upon the opposite sides of its pivoting point, and equally distant from said pivoting point, are attached the ends of two ropes or chains, Y, which pass over guide-pulleys Z, pivoted to the outer sides of the ends of the brackets V, and their lower ends are attached to the cross-bar A', which extends across the machine beneath the rear parts of all the beams S, so that, by operating the lever X, the plows may be raised from and lowered to the ground, as may be required. The bar A' is held in proper position with reference to the beams S by the rods L', the rear ends of which are pivoted to the bar A' and the forward ends of which are pivoted to the cross-bar I.

To each of the brackets V is attached a rearwardly-projecting catch-arm, B', to receive and support the outer end of the lever X in either position, and in such a position that it may be conveniently reached and operated by the driver when walking in the rear of the machine.

To one of the brackets V is also attached a vertical catch-arm, C', to receive and hold the lever X, when the plows are raised, in such a position that it may be conveniently reached and operated by the driver, when riding upon the cover $a'$ of the seed-box A. In this case the lever X, when the plows are in working position, rests upon the other bracket V.

To the outer end of the screw-rod N, that projects beyond the hub of the wheel G, is attached a cone-pulley, D', the inner end of which should be recessed to receive the outer end of the hub of the wheel G.

To the inner end of the hub of the wheel G is attached, or upon it is formed, a similar cone-pulley, E', as shown in fig. 1.

F' is an endless chain, which passes around the cone-pulley E' of the wheel G, over a pair of guide-pulleys, G', suspended above the wheel G, and around the cone-pulley D', of the screw-rod N, so that the said screw rod may be revolved to feed the seeds to the discharge-openings $m^2$ of the pipe M by the advance of the machine.

The block of the pulleys G' is suspended from the upper end of the lever H', which is pivoted to a pin attached to the end B of the seed-box A.

The lower end of the lever H' projects in the rear of the seed-box A, and to it is attached the end of a coiled or equivalent spring, I', the other end of which is attached to the end B of the box A.

The spring I' should have sufficient strength to hold the chain or band F sufficiently taut to revolve the screw-rod N.

To the rear part of the lever H' is pivoted the upper end of a rod, J', which passes down through a hole in the end of the bar A', and has a collar, K', adjustably secured to it by a set-screw.

By this construction, when the bar A' is raised to raise the plows from the ground, the said bar A' strikes against the collar K', attached to the lever H', and raises the rear end of the lever H'; this slackens the chain F', so that the advance of the machine will not revolve the rod N.

Having thus described my invention,

I claim as new and desire to secure by Letters Patent—

1. The hollow axles F, cast solid with the ends B of the seed-box A, substantially as herein shown and described, and for the purpose set forth.

2. The cone-pulley E' fast to the hub of the wheel, the endless chain F', and the pulley D', fast to the end of screw-rod N, all combined as described, for the purpose of revolving the latter as the vehicle moves forward.

3. The combination of the brackets or supports V, shaft W, pivoted lever X, chains Y, and cross-bar A' with each other and with the plow beams S, substantially as herein shown and described, and for the purpose set forth.

4. The spring I', pivoted lever H', and pulley-block of G', combined, as described, with the band F', for the purpose of holding the latter in sufficient frictional contact with the pulleys to rotate the screw.

5. The rod J', passing loosely down through bar A', and collared at K', above it, combined, as described, with lever H', to allow the elevation of said bar A' to raise the end of lever, slacken the chain, and stop the rotation of screw, as set forth.

LYMAN WIGHT.

Witnesses:
SYLVESTER HANSON,
FERNANDO O. KISER.